US008437503B2

(12) United States Patent
Verdant

(10) Patent No.: US 8,437,503 B2
(45) Date of Patent: May 7, 2013

(54) METHOD FOR DETECTING A MOVING OBJECT IN AN IMAGE STREAM

(75) Inventor: Arnaud Verdant, La Tour du Pin (FR)

(73) Assignee: Commissariat a l'Energie Atomique, Paris (FR)

( * ) Notice: Subject to any disclaimer, the term of this patent is extended or adjusted under 35 U.S.C. 154(b) by 835 days.

(21) Appl. No.: 12/124,713

(22) Filed: May 21, 2008

(65) Prior Publication Data

US 2009/0110240 A1    Apr. 30, 2009

(30) Foreign Application Priority Data

May 22, 2007   (FR) ...................................... 07 55181

(51) Int. Cl.
*G06K 9/00*    (2006.01)

(52) U.S. Cl.
USPC .......................................................... 382/103

(58) Field of Classification Search .................. None
See application file for complete search history.

(56) References Cited

U.S. PATENT DOCUMENTS

| 6,993,158 | B2 * | 1/2006 | Cho et al. ....................... 382/103 |
| 7,801,330 | B2 * | 9/2010 | Zhang et al. ................... 382/103 |
| 2005/0162515 | A1 | 7/2005 | Venetianer | |

FOREIGN PATENT DOCUMENTS

| EP | 0 961 226 | 12/1999 |
| WO | WO 00/73996 | * 12/2000 |

OTHER PUBLICATIONS

Yeon-Sung Choi, et al: "Salient Motion Information Detection Technique Using Weighted Subtraction Image and Motion Vector" Hybrid Information Technology, 2006. ICHIT '06. vol. 1. International Conference on, IEEE, PI, Nov. 2006, pp. 263-269, XP031022327; ISBN: 0-7695-2674-8, Sections 2.1, 2.2, 2.3, 2.4.
Fuentes et al: "People tracking in surveillance applications" Image and Vision Computing, Guildford, GB, vol. 24, No. 11, Nov. 1, 2006, pp. 1165-1171, XP005681953; ISSN: 0262-8856, Section 3.
Wiklund J et al: "Image sequence analysis for object tracking" Proceedings of Scandinavian Conference on Image Analysis, vol. 2, Jun. 5, 1987, pp. 641-648, XP008089902; Section 2.1.
Wixson L et al: "Detecting salient motion by accumulating directionally-consistent flow" Computer Vision, 1999. The Proceedings of the Seventh IEEE International Conference on Kerkyra, Greece Sep. 20-27, 1999, Los Alamitos, CA, USA, IEEE Comput. Soc, US, vol. 2, Sep. 20, 1999, pp. 797-804, XP010350486; ISBN: 0-7695-0164-8.
Brown L et al: "Smart video surveillance" IEEE Signal Processing Magazine, IEEE Service Center, Piscataway, NJ, US, vol. 22, No. 2, Mar. 2005, pp. 38-51, XP011128092; ISSN: 1053-5888; Section "Salient Motion Detection" pp. 41-42.

* cited by examiner

*Primary Examiner* — Andrew W Johns
*Assistant Examiner* — David F Dunphy
(74) *Attorney, Agent, or Firm* — Burr & Brown

(57) ABSTRACT

The invention relates to a method for detecting a moving object in a stream of images taken at successive instants, of the type comprising, for each zone of a predefined set of zones of at least one pixel of the image constituting a current image, a step of determining whether the zone belongs to the moving object. The method also comprising a step of searching in at least one preceding image of the stream and along at least one predefined direction and orientation, for another zone determined as belonging to a moving object, and a step of negating the fact that said zone belongs to a moving object if the search is negative.

12 Claims, 3 Drawing Sheets

METHOD FOR DETECTING A MOVING OBJECT IN AN IMAGE STREAM

FIELD OF THE INVENTION

The present invention relates to a method for detecting a moving object in a stream of images taken at successive instants.

BACKGROUND OF THE INVENTION

Methods are known in the prior art for detecting a moving object in a stream of images, based on a variation in time of the luminosity of the image pixels. For example, for a current image, it is determined whether a pixel belongs to a moving object when the value of this pixel has varied significantly from the immediately preceding image in the stream. A binary image is thus obtained from the current image, in which the pixels are usually at the value "1" when they belong to a moving object and at the value "0" if not.

This type of detection therefore does not take account of variations in the value of the neighboring pixels. A relatively high noise appears in the binary image due to interference events in the scene observed, such as a rustle of foliage or a rapid and high local variation in contrast.

To correct this drawback, algorithms have been proposed for detecting local translations of movements within the image stream. These algorithms make use of techniques called "optical flow" techniques. According to these techniques, a vector of moving objects is computed through an iterative search of the most probable movement of the predefined luminosity values in their respective neighborhoods from one image to the next. Mention can be made for example of the article "*A block matching approach for movement estimation in a CMOS retina: principle and result*" de D. Navarro et al., Proceedings of ESSCIRC, 2003, pages 615-619.

However, this type of algorithm is highly iterative and therefore demands considerable computation resources and/or time. It is therefore difficult to consider implementing them by a computation unit with limited resources, as is the case for example for a system mounted on a self-propelled vehicle.

SUMMARY OF THE INVENTION

It is the object of the invention to solve the abovementioned problem by proposing a method for detecting a moving object that substantially reduces the interference noise and which does not require a large quantity of computations for the purpose.

For this purpose, the invention relates to a method for detecting one or more moving objects in a stream of images taken at successive instants, comprising steps consisting in generating a first binary image indicating, for each zone of at least 1 pixel of the current image, a first or a second value according respectively to whether it belongs or does not belong to a moving object.

According to the invention, the method further comprises steps consisting in:
  determining, along at least one predefined orientation or direction, for each zone of the first binary image having the first value, whether a zone also having the first value exists in at least one first binary image produced during a preceding movement detection in a preceding image of the stream; and
  generating a second binary image indicating the first value exclusively for the zones of the first binary image for which the preceding search is positive and, if not, indicating the second value, the zones of the second binary image having the first value defining the moving objects identified in the current image.

In other words, the invention relates to a method for detecting a moving object in a stream of images taken at successive instants, of the type comprising, for each zone of a predefined set of zones of at least one pixel of the image constituting a current image, a step consisting and determining whether said zone belongs to the moving object, said method comprising steps of:
  searching, in at least one preceding image of the stream and along at least one predefined direction and orientation, for another zone determined as belonging to a moving object; and
  negating the fact that said zone belongs to a moving object if the search is negative.

Thus, a zone is effectively determined as belonging to a moving object when it further corresponds to a local translation of one zone of the same type from a preceding image to the current image.

Furthermore, as may be observed, the search for these local translations does not require a large quantity of computations because it is limited to detecting the presence of zones of interest in the preceding images. No iterative computation is therefore employed.

According to particular embodiments of the invention, the method comprises one or more of the following features:
  the step of generating the first binary image comprises the steps consisting in:
    determining for each zone of the current image whether the variation between the values recorded for this zone for the current image and a preceding image of the stream is higher than a predefined threshold; and
    generating the first binary image by indicating for each zone the first or the second value according respectively to whether the preceding determination is positive or negative;
  the interval between the current image and the or each preceding image is selected according to an estimated speed of the moving object;
  the or each direction is selected according to an estimated direction of movement of the moving object;
  the search is carried out in the neighborhood of said zone;
  the search is carried out on three neighboring zones along the or each search direction;
  an orientation and a search direction are defined by a predefined vector and the zones searched along this orientation and this direction in said at least one first binary image produced during a preceding movement detection in a preceding image of the stream, are determined according to at least one whole multiple of said vector;
  the or each binary image produced during a preceding movement detection in a preceding image of the stream used for the search is determined according to a whole multiple of at least one predefined time step; and
  the search directions are angularly equally distributed.

BRIEF DESCRIPTION OF THE DRAWINGS

The invention would be better understood from a reading of the description that follows, provided exclusively as an example, in conjunction with the appended drawings in which.

DETAILED DESCRIPTION OF THE INVENTION

Figure 1:
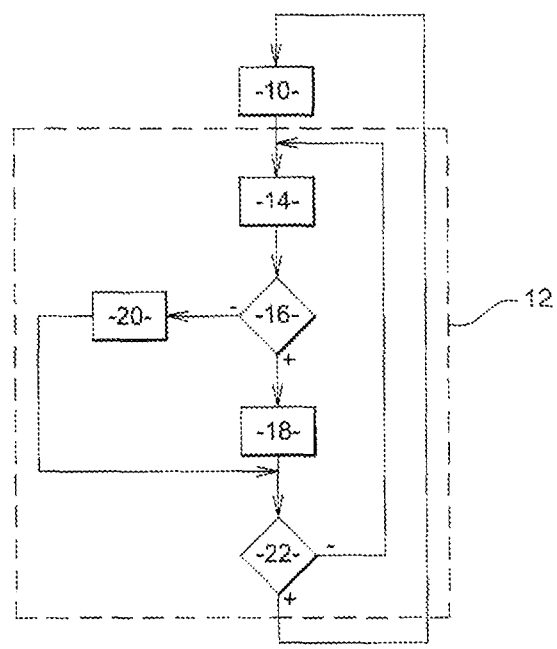
FIG. 1 is a flowchart of a method according to the invention.

A method according to the invention for detecting moving objects in a stream of images from an image sensor will now be described in relation to FIG. 1.

The image sensor periodically produces an image of an observed scene. This image is read and stored by a data processing unit which uses the detection method.

The method applies in the example below to the detection of moving object at the scale of a pixel of the image.

In a first step 10, each pixel of the current image is analyzed to determine whether it belongs to a moving object. For example, the current value of the pixel, for example its luminance, the value of the red channel, the blue channel or the green channel for example, is compared to that of the immediately preceding image. If a variation in the value of the pixel is higher than a predefined threshold value, this pixel is determined as belonging to a moving object. On completion of the step 10, a binary image is thereby obtained of the current image, the value of a pixel of the binary image being equal to 1 when the pixel is determined as belonging to a moving object and equal to 0 if not.

As an alternative, the current value of the pixel is compared to that of an image more distant in time than the immediately preceding image in order to take account of a high reading frequency of the image sensor, conventionally about 50 to 60 Hz in viewing systems. Thus, the apparent movement of the object between the current image and the image distant in time is greater and therefore more easily detectable.

Similarly, for the same reasons as those mentioned above, when the reading frequency of the image sensor is high with regard to the speeds of movement of the objects to be detected, it is advantageous to process only one image of the stream out of N images, such as for example one image out of 3, in order to save resources, without this being detrimental to the quality of the detection of the moving objects.

Obviously, any algorithm for detecting moving objects can be employed in step 10.

The method then continues with a step of confirmation/negation 12 of the state of the pixels determined as belonging to a moving object.

This confirmation/negation step 12 comprises a step 14 in which a pixel having a value "1" is searched for in the binary images previously generated on completion of step 10. In the rest of the discussion, this pixel is qualified as "analysis pixel" for reasons of clarity.

This search is carried out in one or more predefined search directions and orientations. For example, in connection with the surveillance of highway traffic by a camera installed at the edge of the carriageway, the direction and orientation of movement of the vehicles in the image stream is known. A search in this direction is therefore privileged.

If no information on the movement of the objects is known a priori, a search is then carried out in several different directions from the analysis pixel. For example, eight angularly equally distributed search directions are selected around the analysis pixel.

Preferably, data on the speed of movement of the objects are also used for selecting the preceding binary images used for the search.

For example, for an object moving slowly with regard to the reading frequency of the image sensor, it is advantageous to select binary images very distant in time from the current binary image in order to detect a translation of this object in the image more reliably. In fact, by selecting the immediately preceding binary image for the detection of this object, it is possible that the movement thereof may not be sufficient to be detected. On the contrary, if a rapidly moving object is to be detected, preceding binary images close in time to the current binary image are selected.

Preferably, the search is limited to the immediate neighborhood of the analysis pixel, for example a search on three neighboring pixels in the search direction or directions. This serves to minimize an erroneous determination of a local translation of an object. If, for example, the search is carried out on all the pixels in one search direction, a pixel having the value "1" very distant from the analysis pixel could be considered as belonging to the same object as the analysis pixel, although it belongs to a different object.

Furthermore, the larger the number of binary images selected for the search, the lower the risk of not detecting a local translation. However, to ensure that the search step 14 does not require considerable memory resources, a number of three preceding binary images is preferred. This number in fact offers a good compromise between the quantity of memory used and the accuracy of the search step.

The method then continues with a step 16 in which a test is performed to determine whether the search carried out at 14 has revealed the existence of at least one pixel having the value "1" in the preceding binary images selected, along the search direction or directions.

If the result of this test is positive, the state of the analysis pixel according to which it belongs to a movement object is confirmed at 18 by leaving its value at "1".

If the result of this test is negative, the state of the analysis pixel is negated at 20 and the value thereof is set at "0", therefore meaning that it does not belong to a moving object.

The steps 18 and 20 then continue with a test step 22 to determine whether all the pixels at "1" of the current binary image issuing from step 10 have been analyzed. If this is not the case, the step 22 loops to the step 14 for the analysis of the next pixel. If not, the step 22 loops to the step 10 for detecting moving objects in the next image.

By denoting the binary matrix produced in step 10 "M(x, y, t)", where x and y are the coordinates of the pixels, and t the current time, a variation in time of a pixel of the current image is considered as relevant if it is preceded in time by significant variations in the neighboring pixels, along a given orientation and direction. A binary matrix T(x, y, t), combining the concept of local time detection of a movement contained in the binary matrix M(x, y, t) with the concept of an object in translation, is thereby obtained on completion of step 12.

For example, by only considering one search direction on two preceding binary images, the binary matrix T(x, y, t) is obtained according to the logic equation:

$$T(x,y,t)=M(x,y,t)\,ET\,M(x-\delta x,y-\delta y,t-\delta t)\,ET\,M(x-2\delta x,y-2\delta y,t-2\delta t) \quad (1)$$

Where δx, δy are positive or negative parameters defining the search orientation and direction, and δt is a positive parameter defining the preceding binary images selected for the translation search. More generally, the zones searched are thus determined according to whole multiples of the search vector (δx, δy), and the preceding binary images are determined by whole multiples of the time step δt.

Figure 2:
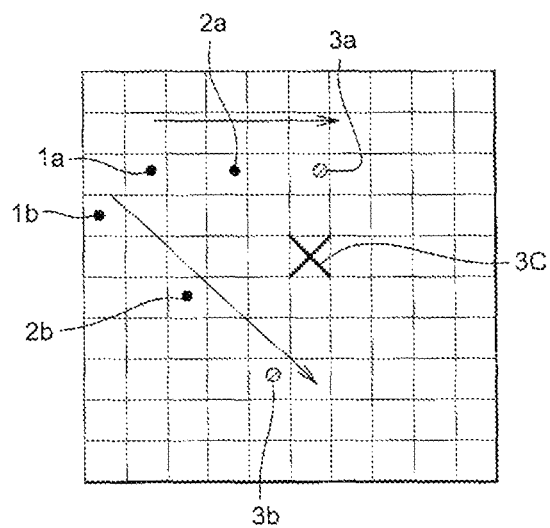
FIG. 2 is a matrix illustrating the search for translation in an image stream.

This principle of combination between local time variation and translation is illustrated in FIG. 2. In this figure, the pixels 3a, 3b and 3c have been detected as belonging to a moving object owing to the variation in their value. Local time variations have therefore been detected. By carrying out a search in the west/east translation direction in the preceding binary images, the pixels 1a and 2a considered during the preceding search have been detected as also belonging to a moving object. A translation in the west/east direction is therefore detected and the fact that the pixel 3a belongs to a moving object is therefore confirmed. Similarly, a search in the northwest/southeast direction is carried out for the pixel 3b. The detection of the pixels 1b and 2b reflects a translation in this direction and thereby serves to confirm the fact that the pixel 3b belongs to a moving object.

On the contrary, for the pixel 3c, neither search in the west/east direction nor search in the northwest/southeast direction reveals the presence of a pixel. The fact that the pixel 3c is considered as belonging to a moving object on completion of step 10 is negated. Its value therefore switches from the value "1" to the value "0".

The elements of the matrix M(x, y, t) considered as relevant are therefore maintained in the binary image obtained T(x, y, t) at "1". The filtered elements are switched to "0".

The parameters δx, δy and δt can be adjusted to select a class of object having a given size and speed. The parameters δx and δy are advantageously set proportionately to the size of the object. Elements of size smaller than the grid defined by the steps δx and δy are then filtered. Similarly, the parameter δt is set proportionally to the speed of the object to be detected. The speed elements lower than the time discretization defined by the parameter δt are therefore filtered.

The filtering equation (1) is restricted to one search direction. This equation can be generalized to a plurality of search directions, in order to filter along several directions and orientations, or even to define a second filtering grid relative to a second object size to be detected. For example, the matrix T(x, y, t) is obtained according to the logic equation:

$$T(x,y,t)=(M(x,y,t)ET\,M(x-\delta x1,y-\delta y1,t-\delta t)ET\,M(x-2\delta x1,y-2\delta y1,t-2\delta t))OU(M(x,y,t)ET\,M(x-\delta x2,y-\delta y2,t-\delta t)ET\,M(x-2\delta x1,y-2\delta y1,t-2\delta t)) \quad (2)$$

Where δx1, δy1, δx2 and δy2 are positive or negative parameters defining the search orientation and direction. More generally, the searched zones are thus determined according to whole multiples of the search vectors (δx1, δy1) and (δx2, δy2).

Similarly, in combination or not with the generalization to a plurality of directions and grids, the filtering principle can be extended in time in order to select objects having different speeds. For example, the matrix T(x, y, t) is obtained according to the logic equation:

$$T(x,y,t)=(M(x,y,t)ET\,M(x-\delta x,y-\delta y,t-\delta t1)ET\,M(x-2\delta x,y-2\delta y,t-2t1))OU(M(x,y,t)ET\,M(x-\delta x,y-\delta y,t-\delta t2)ET\,M(x-2\delta x,y-2\delta y,t-2\delta t2)) \quad (3)$$

where δt1 and δt2 are positive parameters defining the preceding binary images selected for the translation search. More generally, the preceding binary images are determined according to whole multiples of the time steps δt1 and δt2.

Figure 3:
FIGS. 3 and 4 are examples of detections of moving objects without and with the use of an invented method respectively, the detection being carried out at the scale of a pixel.

FIG. 3 is an example of a binary image obtained on completion of step 10. This image derives from the capture of a scene comprising a pedestrian and a portion of a moving car. The scene also comprises trees whereof the foliage is stirred by the wind, in a top left portion of the image. As may be observed, the movement of the foliage has been detected as a multitude of small moving objects, so that a high noise is present in the portion comprising the trees.

Figure 4:
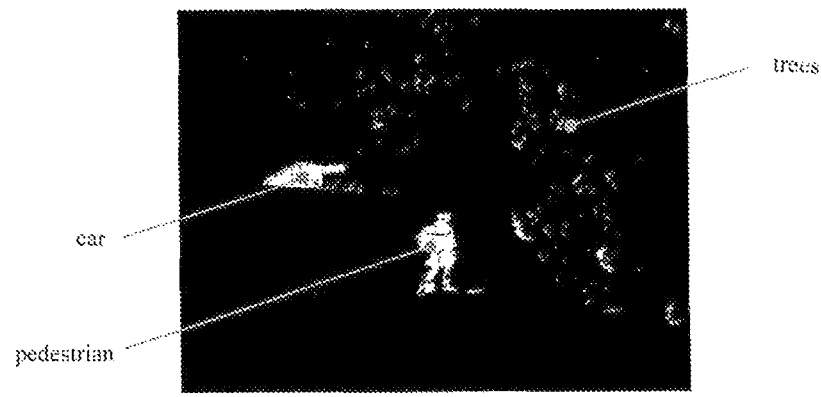

FIG. 4 is a binary image obtained on completion of the confirmation/negation step 12 described above. As may be observed, the noise corresponding to the foliage of the trees has been substantially reduced.

A detection of moving objects has been described for all the pixels of the image considered individually.

The inventive method also applies to the detection of moving objects in a stream of images issuing from an image sensor read in a "subresolution" mode in which the detection is carried out at macropixel scale.

This type of reading consists in:

A. subdividing the image sensor into identical subsets of pixels or macropixels;
B. reading each of the macropixels in low resolution, that is reading a single common value for all the pixels constituting the macropixel, such as for example the mean of the values of these pixels or the value of one pixel of the macropixel;
C. determining whether a macropixel comprises a moving object when the value thereof varies significantly in time; and
D. also reading in high resolution the macropixels comprising a moving object, that is reading all the pixels of these macropixels.

This mixed reading mode, that is a high resolution reading of the macropixels of interest, and a low resolution reading of the others, serves to substantially decrease the quantity of data to be processed and thereby to reduce the power consumption.

As may be observed, in this type of reading, the problems encountered during the detection of moving objects in the macropixels are similar to those described above.

Thus, it is possible to apply, to the detection of moving objects in the macropixels, a confirmation/negation step similar to step 12 described in connection with FIG. 1. Such a step is inserted between the steps C and D described above.

Figure 5:
FIGS. 5 and 6 are examples of detection of moving objects without and with the use of the invented method respectively, the detection being carried out at the scale of a macropixel.

FIG. 5 is an example of an image produced by a sensor read in subresolution mode, exclusively using the steps A, B, C and D. The visible pixellization of this image corresponds to the macropixels.

This image also derives from the capture of a scene comprising a pedestrian in movement and trees whereof the foliage is stirred by the wind. Furthermore, the climatic conditions of the scene are such that rapid variations in contrast take place.

It is thereby observed that macropixels in a foliage zone and in a zone of a rapid and high contrast variation in time have been determined as comprising a moving object. In fact, these macropixels appear in high resolution.

Figure 6:
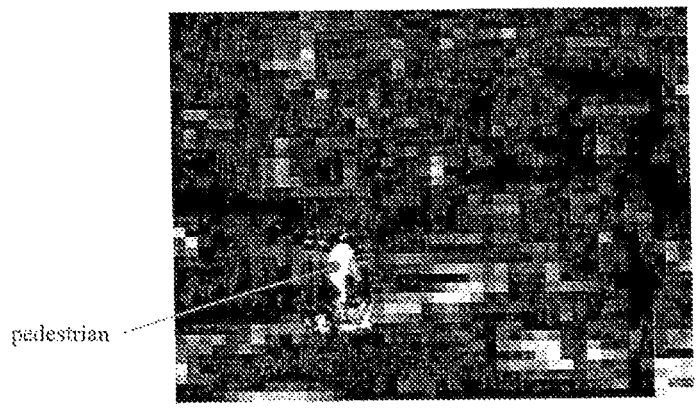

FIG. 6 is an image of the same scene but further using the negation/confirmation step. As may be observed, the foliage and rapid contrast zones previously mentioned have been negated.

Preferably, an algorithm for detecting a moving object in macropixels is of the type described in the document "Adaptative multiresolution for low power cmos image sensor" by Arnaud Verdant et al., *Image Processing, ICIP* 2007, *IEEE international conference on*, vol. 5, pages 185-188, ISBN: 978-1-4244-1437-6, incorporated here by reference.

The invention claimed is:

1. A method for detecting one or more moving objects in a stream of images taken at successive instants, comprising the steps of:

generating a first binary image for each image indicating, for each pixel or macropixel, a first or a second value according respectively to whether it belongs or does not belong to a moving object, performing, for a current image, a confirmation/negation step based on the current first binary image corresponding to the current image, the confirmation/negation step consisting of:

searching, for each pixel or macropixel of the current first binary image having the first value, in a plurality of preceding first binary images and along at least one predefined orientation and direction, to determine whether a pixel or macropixel also having the first value exists in at least one first binary image in the plurality of preceding first binary images; and generating a second binary image based on the current first binary image by keeping the second value for each pixel or macropixel of the current first binary image having the second value, confirming the first value exclusively for each pixel or macropixel of the current first binary image for which the preceding search is positive, and if not, indicating the second value, wherein each pixel or macropixel of the second binary image having the first value define the one or more moving objects identified in the current image.

2. The method as claimed in claim 1, wherein the step of generating the first binary image comprises the steps of:

determining for each pixel or macropixel of the current image whether the variation between the values recorded for this pixel or macropixel for the current image and a preceding image of the stream is higher than a predefined threshold; and generating the first binary image by indicating for each pixel or macropixel the first or the second value according respectively to whether the preceding determination is positive or negative.

3. The method as claimed in claim 1, wherein the interval between the current image and each preceding image in the plurality of preceding images is selected according to an estimated speed of the moving object.

4. The method as claimed in claim 1, wherein the at least one direction is selected according to an estimated direction of movement of the moving object.

5. The method as claimed in claim 1, wherein the search is carried out in the neighborhood of said pixel or macropixel.

6. The method as claimed in claim 4, wherein the search is carried out on three neighboring pixels or macropixels along the at least one predefined direction.

7. The method as claimed in claim 4, wherein the at least one predefined orientation and direction are defined by a predefined vector and wherein pixels or macropixels searched along the at least one predefined orientation and this direction in said at least one first binary image produced during a preceding movement detection in a preceding image of the stream are determined according to at least one whole multiple of said vector.

8. The method as claimed in claim 1, wherein each binary image produced during a preceding movement detection in a preceding image of the stream used for the search is determined according to a whole multiple of at least one predefined time step.

9. The method as claimed in claim 1, wherein search directions are angularly equally distributed.

10. The method as claimed in claim 1, wherein the second binary image indicates the first value exclusively for each pixel or macropixel
of the first binary image for which there exists at least two corresponding pixels or macropixels having the first value in said plurality of preceding first binary images along said at least one predefined orientation and direction.

11. The method as claimed n claim 1, wherein the generation of a first binary image corresponding to an image taken at time t includes production of a binary matrix M(x, y, t), where x and y are the coordinates of the pixels or the macropixels.

12. The method as claimed in claim 1l wherein the generation of a second binary image, at the current time t, includes production of a binary matrix T(x, y, t), where x and y are the coordinates of the pixels or the macropixels, the binary matrix T being obtained based on the binary images M corresponding to the current first binary image and at least one preceding first binary image.

* * * * *